(12) United States Patent
Yogev

(10) Patent No.: US 6,776,154 B2
(45) Date of Patent: Aug. 17, 2004

(54) SOLAR ENERGY SYSTEM WITH DIRECT ABSORPTION OF SOLAR RADIATION

(75) Inventor: Amnon Yogev, Rehovot (IL)

(73) Assignee: Yeda Research and Development Co., Ltd., Rehovot (IL)

( * ) Notice: Subject to any disclaimer, the term of this patent is extended or adjusted under 35 U.S.C. 154(b) by 30 days.

(21) Appl. No.: 10/012,031

(22) Filed: Dec. 11, 2001

(65) Prior Publication Data

US 2002/0112719 A1 Aug. 22, 2002

(30) Foreign Application Priority Data

Dec. 11, 2000 (IL) ................................. 140212

(51) Int. Cl.$^7$ ............................... F24J 2/44; F24J 2/30
(52) U.S. Cl. ................... 126/639; 126/645; 122/13.01
(58) Field of Search ............................ 126/639, 645, 126/678; 60/641.8; 122/13.01, 494

(56) References Cited

U.S. PATENT DOCUMENTS

| | | | |
|---|---|---|---|
| 3,905,352 A | * | 9/1975 | Jahn .......................... 126/578 |
| 3,988,901 A | * | 11/1976 | Shelton et al. ................ 62/116 |
| 4,055,948 A | | 11/1977 | Kraus et al. |
| 4,217,882 A | | 8/1980 | Feldman, Jr. |
| 4,229,184 A | * | 10/1980 | Gregg ......................... 48/62 R |
| 4,253,307 A | * | 3/1981 | Smith ......................... 60/641.9 |
| 4,286,581 A | | 9/1981 | Atkinson, Jr. |
| 4,320,743 A | | 3/1982 | Allen |
| 4,338,922 A | * | 7/1982 | Moore ......................... 126/714 |
| 4,745,906 A | | 5/1988 | DeBeni et al. |
| 5,214,921 A | | 6/1993 | Cooley |
| 5,245,986 A | | 9/1993 | Karni |
| 5,551,237 A | | 9/1996 | Johnson |
| 5,849,838 A | | 12/1998 | Barlow |

* cited by examiner

*Primary Examiner*—Alfred Basichas
(74) *Attorney, Agent, or Firm*—Browdy and Neimark, P.L.L.C.

(57) ABSTRACT

A solar energy system comprises a solar absorber in the form of a solar boiler tank with a lower working liquid region having a liquid inlet and filled with a working liquid capable of boiling under a predetermined pressure, and an upper vapor accumulation region having a vapor outlet for withdrawing from the tank a vapor created in the tank. The system further comprises vapor utilization means associated with the vapor outlet. The solar boiler tank has at least one transparent window to receive and pass towards the working liquid highly concentrated solar radiation. The system also comprises means for controlling the pressure of vapor in the vapor accumulation region to make the working liquid boil at the predetermined pressure.

22 Claims, 2 Drawing Sheets

SOLAR ENERGY SYSTEM WITH DIRECT ABSORPTION OF SOLAR RADIATION

FIELD OF THE INVENTION

The present invention relates in general to solar energy systems in which solar energy is directly absorbed by a working fluid, and in particular to systems with heat engines.

BACKGROUND OF THE INVENTION

Solar energy systems associated with heat engines may be based either on non-direct or on direct absorption of concentrated solar radiation energy by a working fluid.

In solar energy systems with non-direct absorption, the energy of concentrated solar radiation is absorbed by ceramic or metallic absorber bodies in an absorbing chamber where working fluid is heated by the absorber bodies and circulates between the absorbing chamber and a heat engine (U.S. Pat. Nos. 5,849,838, 4,320,743). In such systems there exists a substantial temperature difference between the solar absorber bodies and the working fluid, which may cause boiling of the working fluid at the area of its contact with the absorber bodies, reducing the local heat transfer coefficient and causing hot spots. When the working fluid is in the form of an organic liquid, as preferred for various heat engines, decomposition or carbonization of the liquid may occur at the areas of its contact with the absorber bodies that may completely paralyze the system. For this reason, solar energy systems with organic working fluids have a maximal allowed working temperature of approximately 400° C. However, this limit may not be closely approached due to variations of the solar radiation intensity, which does not allow the use of highly concentrated solar radiation.

In solar energy systems that are based on direct absorption of the energy of concentrated solar radiation by the working fluid (U.S. Pat. Nos. 4,055,948, 5,214,921, 4,286,581), the working fluid is directly heated to high temperatures at a high pressure absorption chamber and is subsequently transferred to a boiling chamber where it expands and evaporates, for the vapor to be used in a heat engine. In some of the direct absorption systems, the working fluid is in the form of a suspension with solar radiation absorbing particles melting into liquid phase upon being heated by concentrated solar radiation.

SUMMARY OF THE INVENTION

The present invention suggests a direct absorption device in which solar radiation energy is absorbed directly by a working liquid and is transformed into the latent heat of boiling the liquid to form vapor whose pressure is controlled to make the working liquid boil at a predetermined temperature.

In accordance with the present invention, there is provided a solar energy system comprising a solar absorber in the form of a solar boiler tank with a lower working liquid region having a liquid inlet and filled with a working liquid capable of absorbing highly concentrated solar radiation and boiling thereupon under a predetermined pressure, and an upper vapor accumulation region having a vapor outlet for withdrawing from the tank a vapor created in the tank, and vapor utilization means associated with said vapor outlet, said solar boiler tank having at least one transparent window to receive and pass towards the working liquid highly concentrated solar radiation, the system further comprising means for controlling the pressure of vapor in said vapor accumulation region to make the working liquid boil at said predetermined pressure.

Since the absorbing factor of working liquids is normally low, their absorption of concentrated solar radiation inside the solar boiler tank, according to the present invention, may be easily controlled avoiding the risk of overheating and disintegration of the working liquid.

Preferably, the working liquid is an organic liquid, which enables the use of highly concentrated solar radiation (up to 1000 and even more) and, consequently, small dimensions of the absorber. In this case, the vapor utilization means may comprise a heat engine where the organic vapor is used to produce mechanical power and optionally electrical power and, when condensed there, is introduced by means of a high pressure feed pump, back into the solar boiler tank through the working liquid inlet. When the vapor utilization means is of the kind where a working fluid other than the organic liquid is preferred, which however at high temperatures develops high working pressures, the organic liquid may still be used as a working liquid in a primary cycle of production of the organic vapor whilst in a secondary cycle, the vapor's heat will be utilized in any appropriate manner for heating or evaporating said other working fluid. Such a design may be suitable for use with the secondary cycle working fluid being water steam.

Preferably, the solar energy system of the present invention comprises a solar radiation concentration system in the form of a field of heliostats and an additional concentrator such as a CPC associated with said at least one window. In this case, it is preferable that the solar boiler tank has a plurality of windows each facing a group of heliostats or one heliostat and each provided with said additional concentrator. This design enables the use of small windows and provides for any required concentration within the thermodynamic limit.

The windows in the solar boiler tank of the present invention may be made of any material suitable for working temperatures and pressures of the system without any concern of overheating because the windows are immersed in the working liquid.

The solar boiler tank may be disposed above the field of heliostats (on a solar tower or on a hill), in which case said mirrors are formed at the lower region of the solar boiler tank. The vapor utilization means in this case does not need to be located in the vicinity of the solar boiler tank but rather may be remote therefrom, e.g. on the ground level, with the vapor being delivered thereto via a pipe. The solar boiler tank may also be disposed at the ground level, in which case the window(s) should preferably be formed at the upper region of the solar boiler tank. In fact, in the latter case, the window(s) may be formed at any location of the solar boiler tank, provided the solar radiation concentration optics is built to thereto direct concentrated solar radiation enabling all this radiation to pass towards the working fluid.

The pressure control means in the system according to the present invention may be in the form of a pressure controller adapted to regulate the pressure of the vapor in the solar boiler tank or in the form of a heat controller adapted to regulate the quantity of said concentrated solar radiation incident on said window. The latter may be obtained by regulating the number of operative heliostats at different times of the day.

The system according to the present invention may be provided with heat storage means in the form of salts or metal alloys located at the bottom of the lower region of the solar boiler tank, that are compatible with the working liquid and capable of changing their phase when heated to temperatures at which the working fluid is designed to boil.

BRIEF DESCRIPTION OF THE DRAWINGS

In order to understand the invention and to see how it may be carried out in practice, embodiments of a solar energy system according to the present invention will now be described, by way of non-limiting example only, with reference to the following drawings in which.

DETAILED DESCRIPTION OF THE DRAWINGS

Figure 1:
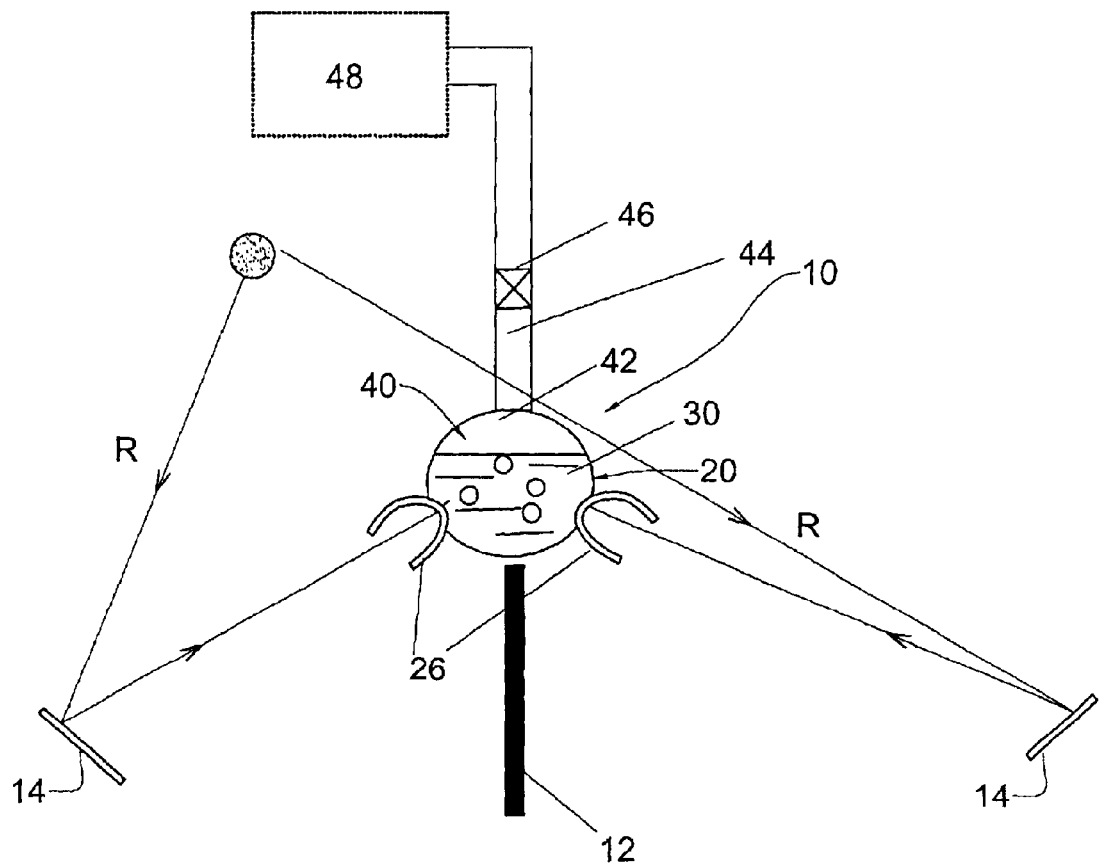
FIG. 1 is a schematic illustration of a solar energy system according to one embodiment of the present invention.

As shown in FIG. 1, a solar energy system of the present invention comprises a solar absorber in the form of a solar boiler tank 10 mounted on a solar tower 12 and at least partially surrounded by a field of heliostats 14.

The solar boiler tank 10 has a lower region 20 formed with a plurality of transparent windows (not shown) each facing one or more heliostat 14 and associated with a non-imaging concentrator 26 such as a CPC to which incoming solar radiation R is directed by the heliostats 14. The CPC 26 concentrates solar radiation incident thereon so as to pass it through the window into the lower region 20. The heliostats 14 and the concentrators 26 are capable of providing extremely high concentration of solar radiation within the thermodynamic limit. For example, the radiation concentration of more than 1000 may be achieved by this design.

Figure 2:
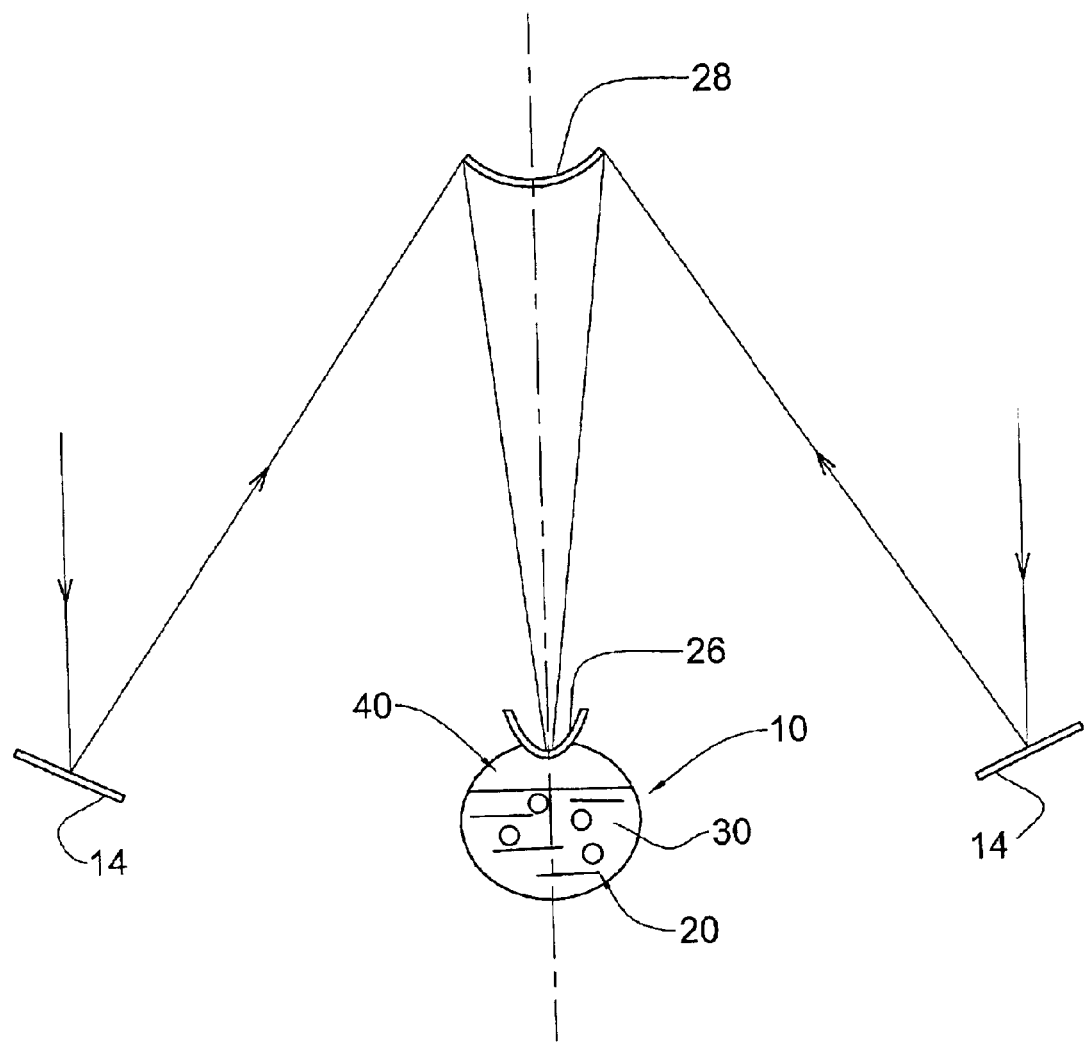
FIG. 2 is a schematic illustration of a solar energy system according to another embodiment of the present invention.

As shown in FIG. 2, the solar boiler tank 10 may also be disposed at the ground level, in which case the system further comprises a tower reflector 28 for admitting radiation concentrated by the heliostats and reflecting it downwardly towards the solar boiler tank's windows (not shown) which in this case are formed at the upper region of the solar boiler tank.

The windows of the solar boiler tank 10 may be dome shaped and may be made of such materials as borosilicate glass e.g. Pyrex or silica glass e.g. quartz.

The exterior of the solar boiler tank other than that occupied by the windows may have a thermal insulating coating. The interior of the solar boiler tank may have reflecting coating at regions opposite the windows.

The lower region 20 of the solar boiler tank is formed with a working liquid inlet (not shown) through which this region 20 is filled with a working liquid 30 adapted to absorb concentrated solar radiation passing through the windows of the tank. The working liquid's absorbing factor may be controlled by changing its optical density, e.g. by adding to the liquid soluble color additives.

The working liquid is chosen depending on the temperature to which it is desired to heat the working liquid for it to boil, and the pressure which the liquid develops when heated to the desired temperature. When low temperatures are needed, the working liquid may be water, whilst for high temperatures organic liquids are used. Typical temperatures to which an organic liquid may be heated within its chemical stability limit are 350° C. to 400° C.

The solar boiler tank 10 further has an upper region 40 for the accumulation of vapor formed by boiling the working liquid 30 in the lower region 20 of the solar boiler tank. The upper region 40 of the solar boiler tank has an outlet 42 with a pipe 44 for the egress of the vapor from the upper region 40, the pipe being associated with a pressure control valve 46 to regulate the pressure of the vapor in the solar boiler tank.

The solar energy system of the present invention further comprises vapor utilization means 48 connected to the pipe 44, capable of converting the heat of vapor withdrawn from the solar boiler tank 10 into other utilizable form of energy.

The vapor utilization means 48 may be of any kind where the vapor accumulated in the solar boiler tank can be used as the working fluid. Thus, the vapor utilization means may be in the form of a heat engine, e.g. a Rankin type cycle heat engine working on an organic vapor, to be withdrawn from the upper region 40 of the solar boiler tank and, when subsequently condensed in the heat engine, pumped into the lower region 20 of the solar boiler tank via the working liquid inlet. In this case, the working liquid used in the system may be one of the group of aliphatic hydrocarbons or light pentane, hexane or their isomers, or aromatic hydrocarbons like benzene, toluene or xylene, or similar hydrocarbons, or condensed aromatic compounds, or their derivatives. Clearly, these are only examples of possible working liquids, and any other suitable organic liquids may be used.

Figure 1A:
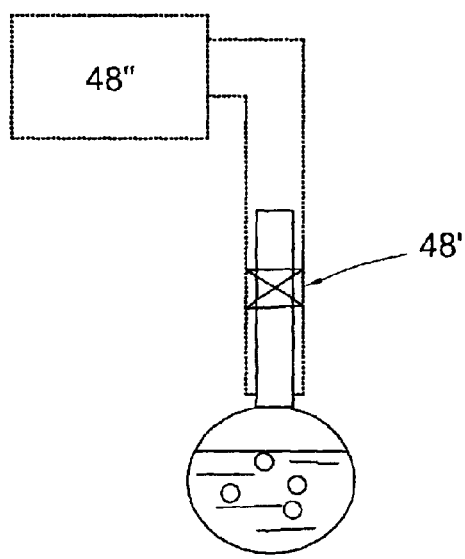
FIG. 1A is a schematic partial illustration of the solar energy system shown in FIG. 1, with a different design of its vapor utilization means.

When the vapor utilization means is of the kind that uses water steam or other non-organic vapor as a working fluid, the means 48 may work on the same principle as described above, if the temperatures of the working liquid in the solar boiler tank do not need to be high. However, if very high temperatures are needed at which the working liquid like water develops very high pressures, this liquid should preferably be replaced by other liquid such as an organic liquid which, at such high temperatures develops much lower pressures. In this case, the system of the present invention has two stages, as schematically illustrated in FIG. 1A, with the primary stage comprising the solar boiler tank as described above with a primary working liquid being an organic liquid whose vapor withdrawn from the solar boiler tank is condensed in a heat exchanger 48', and a secondary stage comprising a tube type steam generator 48' with steam as a secondary working liquid, which is obtained from water by the heat from the heat exchanger. The condensed primary working liquid leaving the heat exchanger 48' is introduced back into the solar boiler tank 10 by the gravity force or any other appropriate means. The organic primary working liquid in this case may be any liquid stable at high temperatures and having a high boiling point such as a suitable paraffin oil or DOW THERM-A at a pressure of up to 20 bar or TER PHENYL at a pressure of 1 bar.

The system of the present invention may have phase change heat storage arrangement based on heat storage mediums, for example appropriate salts or metal alloys such as tin-lead-zinc alloys, that are compatible with the organic working liquid and have a melting point at a temperature at which the working liquid is designed to boil. Such heat storage medium should be located at the bottom of the lower region 20 of the solar boiler tank under the working liquid to absorb extra heat therefrom and to thereby change phase from solid to liquid at a sunny time, and to provide heat to the working liquid and thereby keep it boiling, while changing the phase from liquid to solid at a non-sunny time. This may prolong the use of the system and stabilize its working conditions in the vicinity of the melting point of the heat storage medium.

While the present invention has been illustrated and described with reference to its specific embodiments, it is not intended to be limited to the features shown, since various modifications and structural changes may be made without departing in any way from the spirit of the present invention.

What is claimed is:

1. A solar energy system comprising
    a solar absorber in the form of a solar boiler tank with a lower working liquid region having a liquid inlet and filled with a working liquid capable of absorbing highly concentrated solar radiation and boiling thereupon under a predetermined pressure, and an upper vapor accumulation region having a vapor outlet for withdrawing from the tank a vapor created in the tank,
    vapor utilization means associated with said vapor outlet,
    said solar boiler tank having at least one transparent window to receive and pass towards the working liquid highly concentrated solar radiation towards the working liquid, and
    a solar radiation concentration system in the form of a field of heliostats and an additional concentrator associated with the or each window.

2. A solar energy system according to claim 1, further comprising means for controlling the pressure of vapor in said vapor accumulation region to make the working liquid boil at said predetermined pressure, wherein said means for controlling the pressure is in the form of a pressure controller adapted to regulate the pressure of vapor in said vapor accumulation region to make the working liquid boil at said predetermined pressure.

3. A solar energy system according to claim 2, wherein said pressure controller is in the form of a pressure valve associated with said vapor outlet.

4. A solar energy plant according to claim 1, further comprising means for controlling the pressure of vapor in said vapor in said accumulation region to make the working liquid boil at said predetermined pressure, wherein said means is in the form of a heat controller adapted to regulate the quantity of said concentrated solar radiation incident on said window.

5. A solar energy plant according to claim 4, further comprising a solar radiation concentration system in the form of a field of individually controlled heliostats, and said heat controller is adapted to regulate the number of operative heliostats at different times of the day.

6. A solar energy system according to claim 1, further comprising a vapor pipe connected to said vapor outlet to withdraw vapor from said vapor accumulation region and supply it to said vapor utilization means for the vapor's heat to be converted therein into other utilizable forms of energy.

7. A solar energy system according to claim 1, wherein the working liquid is an organic liquid.

8. A solar energy system according to claim 1, wherein the working liquid is water.

9. A solar energy system according to claim 1, wherein the vapor utilization means comprises a heat engine where an organic vapor is used to produce mechanical power and, optionally, electrical power.

10. A solar energy system according to claim 1, wherein said vapor utilization means is designed to use vapor of such working liquid that develops high pressures when heated to high temperatures.

11. A solar energy system according to claim 1, comprising a plurality of windows each facing one or more heliostats.

12. A solar energy system according to claim 1, wherein said solar boiler tank is located on a solar tower above said field of heliostats.

13. A solar energy system according to claim 1, wherein said solar boiler tank is locater at substantially the same level as said field of heliostats, the system further comprising a tower reflector located above said field of heliostats so as to admit radiation concentrated thereby and reflect it onto said additional concentrator.

14. A solar energy system according to claim 1, comprising a plurality of the windows, each being associated with its own said solar radiation concentrator.

15. A solar energy system according to claim 1, further comprising means for controlling the pressure of vapor in said vapor accumulation region to make the working liquid boil at said predetermined pressure.

16. A solar energy system according to claim 1, wherein said vapor utilization means is of the kind where the vapor of the working liquid is condensed, when utilized, the system further comprising means to introduce the working liquid from said vapor utilization means back into the solar boiler tank through the working liquid inlet.

17. A solar energy system according to claim 1, wherein said working liquid comprises soluble color additives for increasing its absorbing factor.

18. A solar energy system according to claim 1, further comprising a phase-change heat storage medium located in said solar boiler tank, that is compatible with the working liquid and capable of changing phase when heated to temperatures at which the working fluid is designed to boil.

19. A solar energy system comprising
    a solar absorber in the form of a solar boiler tank with a lower working liquid region having a liquid inlet and filled with a working liquid capable of absorbing highly concentrated solar radiation and boiling thereupon under a predetermined pressure, and an upper vapor accumulation region having a vapor outlet for withdrawing from the tank a vapor created in the tank,
    vapor utilization means associated with said vapor outlet, said solar boiler tank having at least one transparent window to receive and pass towards the working liquid highly concentrated solar radiation towards the working liquid, wherein said vapor utilization means is designed to use vapor of such working liquid that develops high pressures when heated to high temperatures, wherein the vapor utilization means are adapted to function at two cycles utilizing, respectively, a first working liquid and a second working fluid, so that in a primary cycle, said first working liquid is used which boils in said solar boiler tank at relatively low pressures, whilst in a secondary cycle, the first working liquid vapor's heat is utilized for heating or evaporating said second working fluid.

20. A solar energy system according to claim 19, wherein said first working liquid is an organic liquid.

21. A solar energy system according to claim 19, wherein said second working fluid is a water steam tank is located at substantially the same level as said field of heliostats, the system further comprising a tower reflector located above said field of heliostats so as to admit radiation concentrated thereby and reflect it onto said additional concentrator.

22. A solar energy system comprising a solor abosorber in the form of a solar boiler tank with a lower working liquid region having a liquid inlet and filled with a working liquid capable of absorbing highly concentrated solar radiation and boiling thereupon under a predetermined pressure, and an upper vapor accumulation region having a vapor outlet for withdrawing from the tank a vapor created in the tank, vapor utilization means associated with said vapor outlet, said solar boiler tank having at least one transparent window to receive and pass towards the working liquid highly concentrated solar radiation towards the working liquid, wherein said window is located at said lower working fluid region of the tank, whereby the window is immersed in said working fluid and is prevented from overheating.

* * * * *